United States Patent
Burt et al.

[11] Patent Number: 6,052,213
[45] Date of Patent: Apr. 18, 2000

[54] OPTICAL DIFFRACTION GRATING

[75] Inventors: Michael G Burt, Woodbridge; Robert S Grant, Ipswich, both of United Kingdom

[73] Assignee: British Telecommunications plc, London, United Kingdom

[21] Appl. No.: 09/051,537
[22] PCT Filed: Mar. 24, 1997
[86] PCT No.: PCT/GB97/00817
§ 371 Date: Apr. 13, 1998
§ 102(e) Date: Apr. 13, 1998
[87] PCT Pub. No.: WO97/36198
PCT Pub. Date: Oct. 2, 1997

[30] Foreign Application Priority Data

Mar. 27, 1996 [EP] European Pat. Off. ............ 96302115

[51] Int. Cl.[7] .............................. G02B 26/00; G02F 1/03
[52] U.S. Cl. ............................................. 359/237; 359/245
[58] Field of Search .................................... 359/296, 248, 359/332, 237, 245

[56] References Cited

U.S. PATENT DOCUMENTS

| | | | |
|---|---|---|---|
| 5,245,466 | 9/1993 | Burns et al. | 359/296 |
| 5,389,943 | 2/1995 | Brommer | 343/909 |
| 5,726,805 | 3/1998 | Kaushik et al. | 359/589 |

FOREIGN PATENT DOCUMENTS

| | | |
|---|---|---|
| 0 196 948 | 10/1986 | European Pat. Off. . |
| 0 365 125 | 4/1990 | European Pat. Off. . |
| 94 16345 | 7/1994 | WIPO . |

OTHER PUBLICATIONS

Applied Physics B, vol. 42, 1987, pp. 129–145, Wildman et al, "Standad and phase–matched grazing–incidence and distributed–feedback FIR gas lasers".

Applied Physics Letters, vol. 64, No. 6, Feb. 7, 1994, pp. 687–689, Gourley et al, "Optical Properties of Two–Dimensional Photoonic Lattices Fabricated as Honeycomb Manostructures in Compound Semiconductors".

Japanese Journal of Applied Physics, vol. 35, No. 2b, Feb. 1996, pp. 1348–1352, Baba et al, "Fabrication and photoluminescence studies of GaInAsP/InP 2–dimensional photonic crystals".

Japanese Journal of Applied Physics, vol. 34, No. 8B, Part 01, Aug. 1995, pp. 4496–4498, Baba et al, "Theoretical Calculation of Photonic Gap in Semiconductor 2–Dimensional Crystals with Various Shapes of Optical Atoms".

*Primary Examiner*—Georgia Epps
*Assistant Examiner*—Suzanne Letendre
*Attorney, Agent, or Firm*—Nixon & Vanderhye P.C.

[57] ABSTRACT

An optical diffraction grating is formed from a region of photonic crystalline material Light is coupled into the photonic crystalline material, and the grazingly emergent output beam is collected. The photonic crystalline material may include an array of holes formed in a substrate of dielectric material, e.g., InP, and integrated with planar waveguide structures.

22 Claims, 9 Drawing Sheets

PITCH=0.57 MICRON

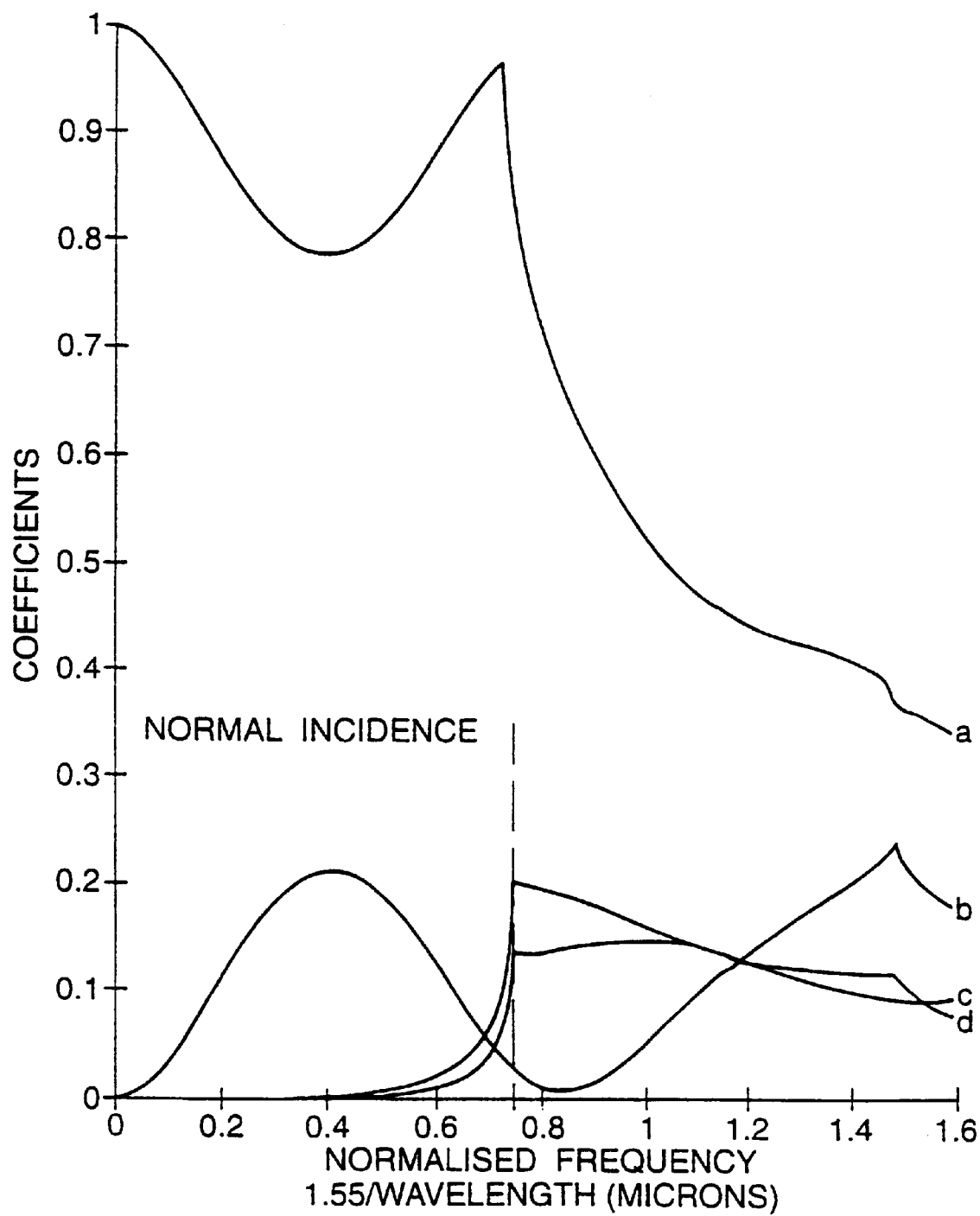

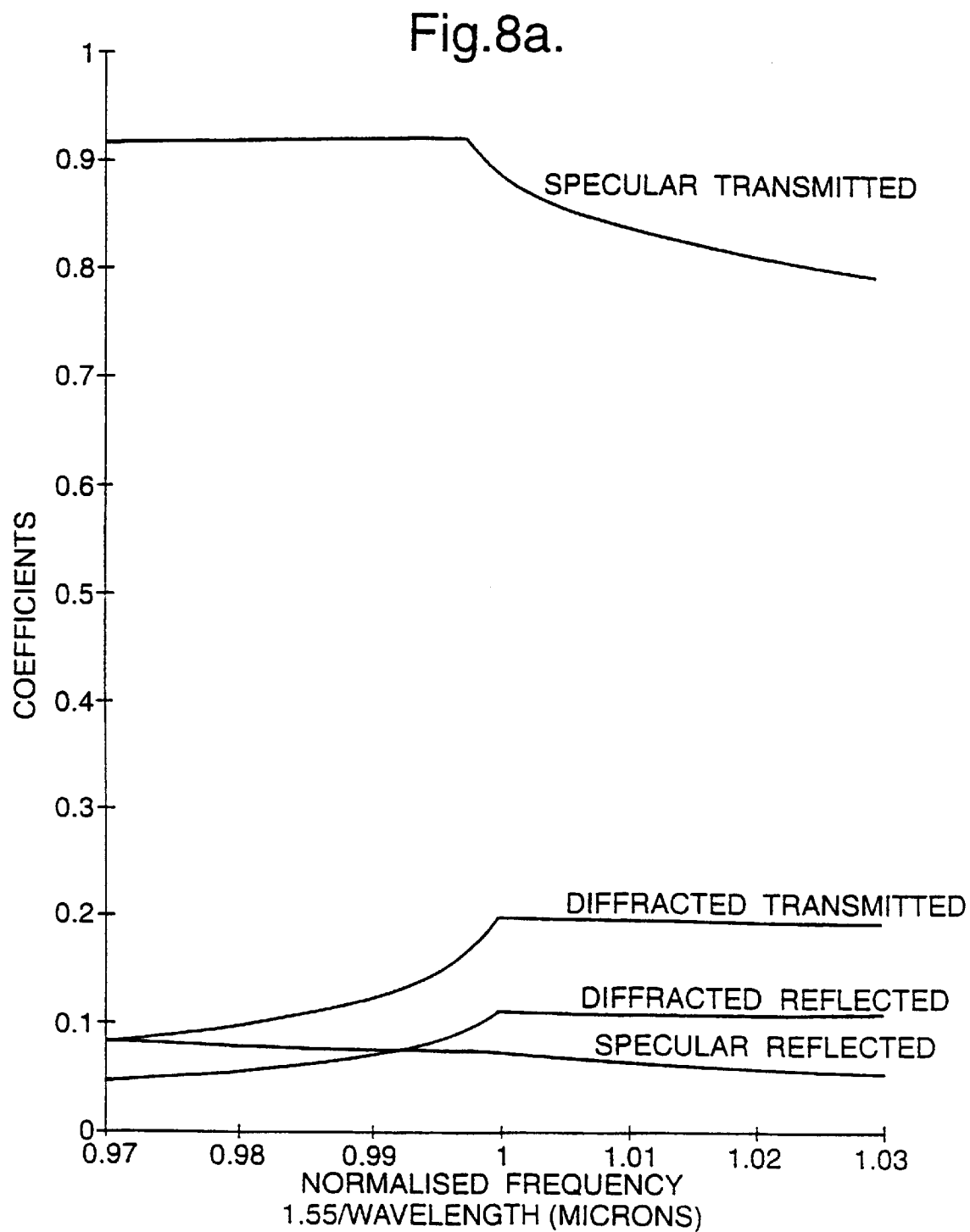

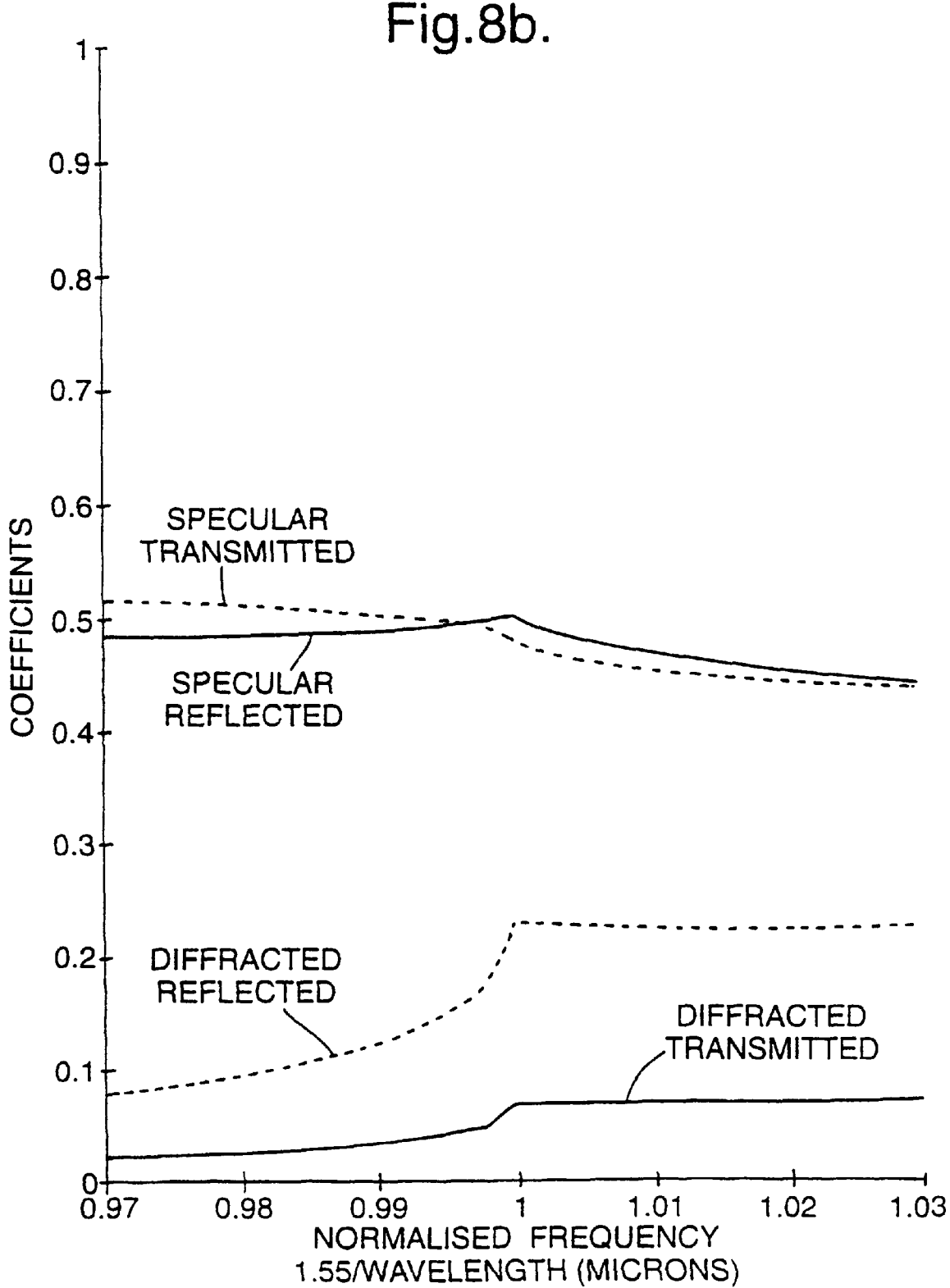

OUTPUT TO
TERMINAL
EQUIPMENT

OPTICAL DIFFRACTION GRATING

BACKGROUND OF THE INVENTION

1. Field of the Invention

The present invention relates to an optical diffraction grating suitable for use, for example, as a wavelength multiplexer/demultiplexer in an optical telecommunications system.

2. Related Art

Bulk optic diffraction gratings are well known, and it has previously been proposed to use such gratings as passive multiplexers/demultiplexers in optical networks employing wavelength division multiplexing (WDM). The use of bulk-optic components tends however to result in high packaging and maintenance costs. Accordingly, while the use of such components might be feasible if wavelength multiplexing/demultiplexing was to be confined to a few core switches, bulk optic components are not suitable for more widespread use in a network. Current interest in WDM centres on its use in local access networks in combination with optical time division multiplexing (OTDM) for longer links in the network. There remains a need therefore for a grating which is sufficiently robust and inexpensive to be used in local access loops throughout a network, and possibly to be present in each subscriber terminal.

The paper by Poguntke and Soole, "Design of A Multi-stripe Array Grating Integrated Cavity (MAGIC) Laser", Journal of Light Wave Technology, Vol. 11 No. 12 December 1993, discloses a grating formed in an InP-based planar waveguide structure. The grating is defined using photolithography and dry etched using, for example, chemically assisted ion-beam etching, to form a stepped wall extending perpendicularly through the planar waveguide. The grating is then metallised in order to improve its reflectivity. This structure, however, offers only limited angular dispersion, and so is not able to accommodate many wavelength channels without becoming unacceptably large.

SUMMARY OF THE INVENTION

According to a first aspect of the present invention, there is provided an optical diffraction grating comprising a region of photonic crystalline material, means for coupling an input beam to the photonic crystalline material, and means for coupling a gratingly emergent output beam from the photonic crystalline material.

The term photonic crystalline material as used herein denotes a material manufactured with a periodic variation in refractive index, having a periodicity of the order of magnitude of an optical wavelength. As further discussed below, such material is sometimes referred to as "photonic band gap material".

The present invention uses photonic crystalline material to provide a grating suitable for integration with other optical components and exhibiting high dispersion and efficiency. Photonic crystals are a class of material manufactured with a periodic dielectric structure. The behaviour of photons within such a structure is found to be analogous to that of electrons within a semiconductor. In particular it is found that there are photonic band gaps (PBGs) analogous to electronic band gaps in semiconductor crystals. Photons having wavelengths within the band gap range are forbidden to propagate. Most work on photonic crystals has focused on producing these photonic band gaps. However, a novel analysis by the present inventor has shown that photonic crystals exhibit another property which can be exploited to provide a highly efficient grating. It is found that if the pitch of the photonic crystal is selected so that the first order diffracted beam is grazingly emergent from the crystal, then the diffracted angle varies sharply with wavelength, while the diffracted beam has a relatively high output intensity, potentially equal to 20% or more of the input optical intensity.

Preferably the region of photonic crystalline material is generally planar. The photonic crystalline material may comprise a generally regular array of scattering centres formed in a dielectric material, in which case preferably the array is a minimal array no more than 10 rows deep and preferably only 1, 2 or 3 rows deep. The scattering centres may comprise holes formed in a dielectric substrate.

While work on photonic band gap materials has previously aimed at producing extensive 3-dimensional arrays, the present inventor has found that an effective diffraction grating can be formed from an array which is only a few rows deep and which may comprise just a single row. Where 2 or more rows are present, then preferably the spacing between the rows is such that, at a predetermined wavelength of operation, the gratingly emergent beam scattered from one row interferes constructively with the grazingly emergent beam scattered from the or each other row.

When the separation between rows is chosen so that in a preferred scattering direction there is constructive interference, then the grating functions as a highly efficient fixed frequency filter and as such is particular valuable for use in WDM systems.

Preferably the means for coupling light to and from the photonic crystalline material include waveguides formed on a common substrate with the photonic crystalline material. The waveguides may comprise planar structures, and may be arranged to confine light in the direction normal to the planar surface. It is particularly preferred that the waveguide should be a ridge waveguide arranged also to confine the beam in the plane parallel to the planar surface. The grating may be arranged to operate transmissively, with the waveguide for the input beam on one side of the photonic crystalline material, and the waveguide for the output beam on the other side of the photonic crystalline material.

Alternatively, the grating may be arranged to function reflectively, in which case the means for coupling the input beams and means for coupling the gratingly emergent output beam are located on the same side of the photonic crystalline material.

Preferably the dielectric material is a III-V material, and more preferably is indium phosphide.

The photonic crystal may comprise a regular array formed from two dielectric materials of differing refractive indices. This structure may be formed as an array of holes in a first dielectric material with the holes filled with a second dielectric material. Alternatively, where the substrate includes, e.g., a quaternary waveguide layer, then the holes may be filled with the same material used to form the basis of the substrate. An alternative structure may comprise pillars of a first dielectric material extending into air or into a second dielectric material. One of the dielectric materials making up the photonic crystal may have a refractive index which is variable in response to an applied control signal. This may be an electro-optic material responsive to an applied electrical field, or a non-linear optical material responsive to an applied optical control signal.

The use of a material with a variable refractive index in the photonic crystal enables the grating to function as a tuneable filter.

According to a second aspect of the present invention, there is provided a method of manufacturing an optical diffraction grating comprising forming a region of photonic crystalline material and forming means for coupling an input beam and means for coupling a grazingly emergent output beam adjacent the said region.

According to another aspect of the present invention, there is provided an optical diffraction grating comprising:

a) an optical input;

b) a region of photonic crystalline material arranged to receive an incident optical beam from the optical input;

c) an optical output arranged to receive an optical beam from the region of photonic crystalline material.

The diffraction grating of this aspect of the invention is not limited to use in configurations in which it is the grazingly emergent beam which is output. It may also be used, for example, in configurations in which the reflected beam is output, or in which a beam diffracted at a relatively larger angle is output.

The present invention also encompasses wavelength multiplexers and demultiplexers including a grating in accordance with the preceding aspects of the invention.

DESCRIPTION OF THE DRAWINGS

Devices and methods of manufacture embodying the present invention will now be described in further detail, by way of example only, with reference to the accompanying drawings in which:

FIGS. 3 includes plots of reflection and transmission coefficients as a function of frequency for the photonic crystal of FIG. 2;

FIGS. 8a and 8b are plots of reflection and transmission coefficients of further examples of gratings embodying the present invention;

DESCRIPTION OF EXAMPLES

Figure 1:
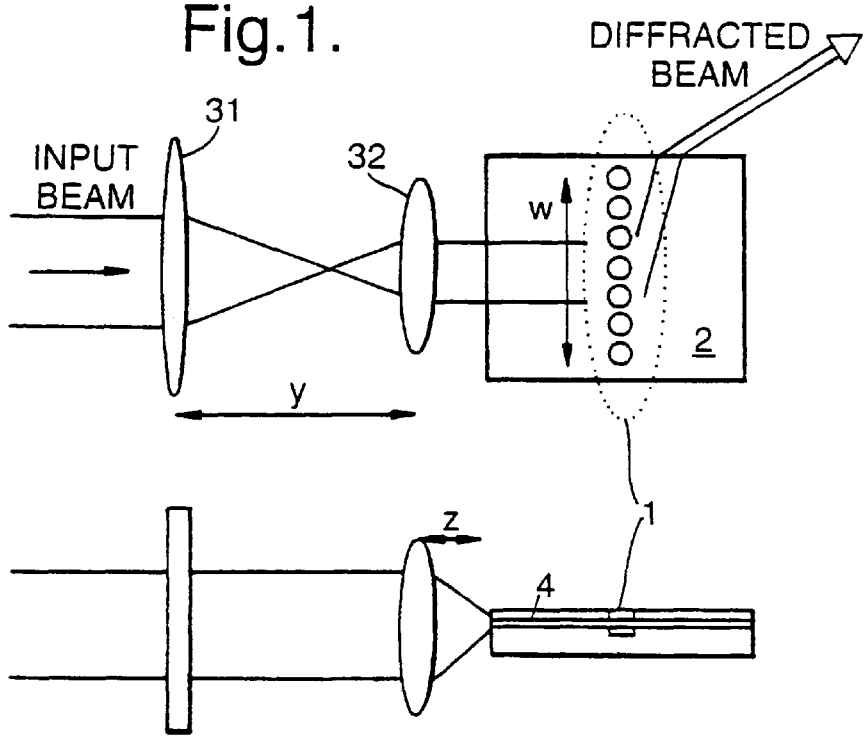
FIGS. 1a and 1b are a plan and sectional side view respectively of a grating embodying the present invention.

A grating comprises a region of photonic crystalline material 1 formed in a multi-layered planar substrate 2. An optical system comprising a first lens 31 with a focal length of, e.g. 10 cm, and a second lens 32 with a focal length of, e.g. 1 cm collimates an input optical beam. The lenses 31,32 are separated by a distance y which is equal to the sum of the focal lengths. The lens 32 is spaced from a facet of the planar substrate 2 by a distance z of 1 cm in this example. The optical system couples light into a waveguide layer 4 where it propagates to meet the photonic crystal 1 with normal incidence. A grazingly emergent diffracted beam is transmitted through the photonic crystal 1 and propagated through the waveguide layer 4 and emerges from a side facet of the planar substrate. The emergent beam tends to diverge in the direction normal to the planar substrate. Optionally a cylindrical lens may be used to collimate the emergent beam.

Figure 2:
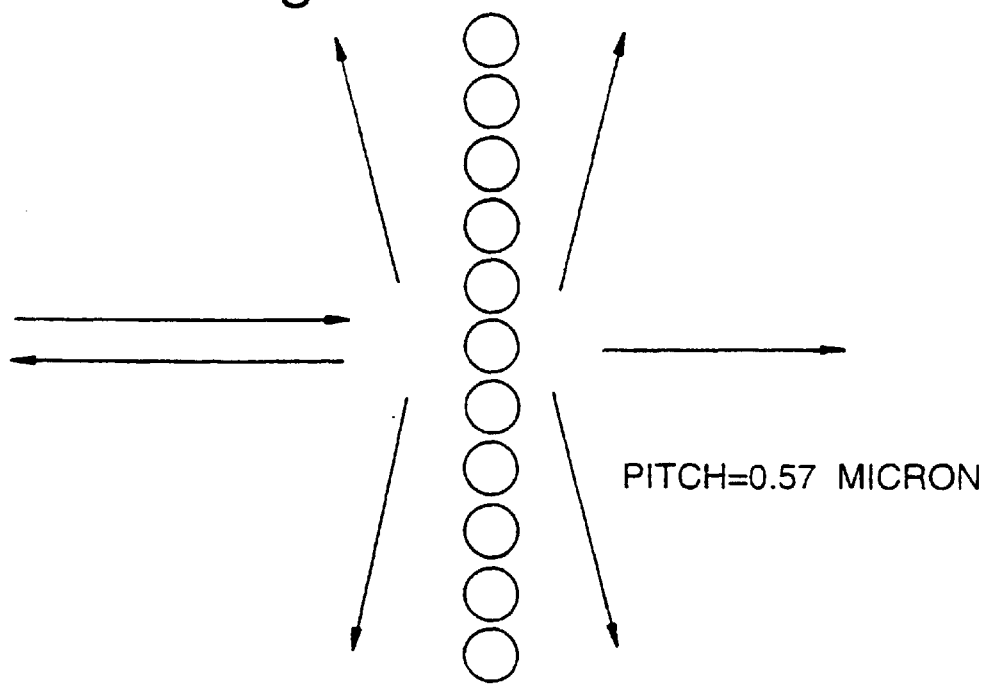
FIG. 2 is a diagram showing schematically the photonic crystal of the grating of FIG. 1.

FIG. 2 shows schematically the configuration of the photonic crystal 1. In this example, it comprises a linear array of holes formed in a substrate of dielectric constant 13 with a pitch of 0.57 $\mu$m. As shown in the diagram, a normally incident input beam with a wavelength of around 1550 nm is diffracted by the photonic crystal to produce grazingly emergent transmitted and reflected beams. In addition, part of the beam passes straight through the photonic crystal without diffraction, and part is reflected. The width of the grating w is in this example 800 microns, the distance from the input fibre to the grating is 4 mm and the distance from the grating to the-output is 4 mm. For ease of illustration, only a relatively few holes are shown in the Figure. In practice, as further discussed below, the array may comprise a row of 1000 or more holes.

FIG. 3 shows the reflection and transmission coefficient for the normally incident beam as a function of frequency normalised to 1.55 $\mu$m. Plot a is the transmission coefficient, b is the reflection coefficient and plots c and d are the coefficients of the transmitted and reflected diffracted beams respectively. The onset of grazing emergence is seen in plots c and d at a normalised frequency of around 0.8 and is marked by the dashed line. As set out in the theoretical analysis below, it is found that the grazingly emergent beam at angles of a few degrees, say 3 to 5 degrees, has a practically useful level of optical power and emerges at an angle which varies rapidly with wavelength.

As an alternative to use with a normally incident beam, the grating may be used with a beam incident at an angle of, e.g., 30 degrees. In this case the grazingly emergent output beam for a given wavelength will have different diffraction angles on either side of the normal to the plane of the photonic crystal.

The pitch and hole size of the array, and the angle of incidence, may be varied according to the refractive index of the substrate material and the desired wavelength range in which the grating is to be used. FIGS. 8a and 8b are graphs showing the performance of gratings constructed with different pitches and angles of incidence. FIG. 8a is for a grating with a pitch of 0.47 microns used at normal incidence. FIG. 8b relates to a grating with a pitch of 0.313 microns used with a beam incident at an angle of 30 degrees to the normal. The hole radius in each case is 0.17 microns in 8a and 0.1175 microns in 8b. In both cases, the dielectric constant of the substrate is 10.9, giving a refractive index of 3.3.

The holes need not have a circular cross section and may, for example, have a cross section which is generally square.

Figure 5:
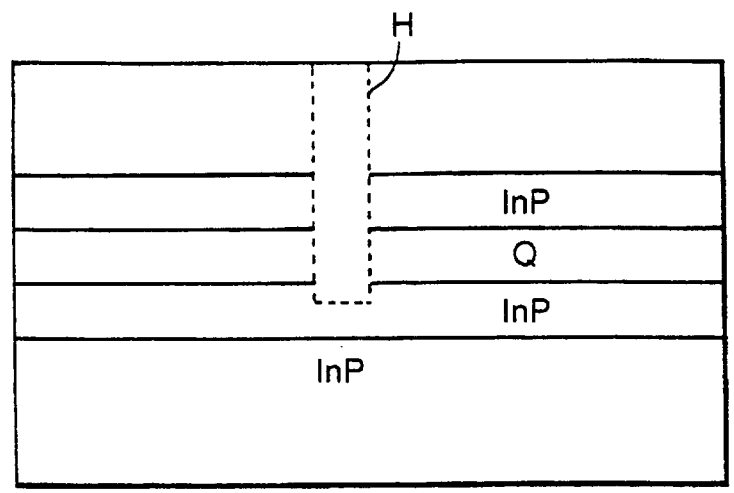
FIG. 5 is a cross-sectional view showing the structure of the planar substrate of the grating of FIG. 1.

In the present examples, the array of holes making up the photonic crystal are produced by reactive ion-beam etching (RIE) in a planar InP substrate. FIG. 5 shows in detail the structure of the planar substrate.

The process of manufacture can be broken down into two stages: an epitaxy or deposition stage, and a subsequent stage in which the microstructure is etched. In the first stage, a waveguiding layer is fabricated on InP semiconductor material by a series of epitaxial depositions using the Metal-Organic Vapour Phase Epitaxy (MOVPE) technique. This first stage includes the following steps:
1. A buffer layer of 1000 nm thickness of InP is deposited;
2. A waveguiding layer 300 nm thick of InGaAsP is deposited—the composition of the InGaAsP is such that it has a bandgap wavelength of approximately 1.3 microns;
3. A cladding layer 300 nm thick of InP is deposited.

All the deposited materials are nominally pure, i.e. undoped.

Subsequently, in the second stage, microstructures are etched into the wafer. This is done using reactive ion etching. Direct write technology is used to create the mask directly on the sample. The second stage involves the following steps:
1. The sample is briefly cleaned in acid and then a 100 nm thick layer of silicon nitride $Si_3N_4$ is deposited.
2. A layer of photoresist which is known as "ebeam resist" and which is sensitive to an electron beam is spun onto the sample to a thickness of approximately 500 nm. In this case, the resist used is that manufactured by Nippon Zeon and known as ZEP520.
3. The resist is exposed in the desired microstructure pattern using electron beam lithography.
4. The resist is then developed. This dissolves the exposed areas. The unexposed ZEP520 remains and forms a mask which is used in the following stages.
5. Reactive ion etching using $CF_4$ etches into the silicon nitride layer. This transfers the the mask pattern from the resist layer to the silicon nitride layer.
6. The sample is cleaned in two stages. The unexposed resist is removed, and then the polymer which results from the RIE process is removed.
7. The main RIE process is carried out. The patterned silicon nitride layer acts as a mask. The etching mixture consists of methane/hydrogen/oxygen. This mixture preferentially etches the InP/InGaAsP material over the silicon nitride mask.
8. The polymer resulting from the RIE process of step 7 is removed.
9. The sample is thinned from approximately 0.5 mm thickness to approximately 150 microns thickness. This makes possible easier cleaving of individual samples. The individual samples are nominally $1\times1$ mm$^2$. The grating microstructure bisects the samples parallel to the sides.

Figure 6:
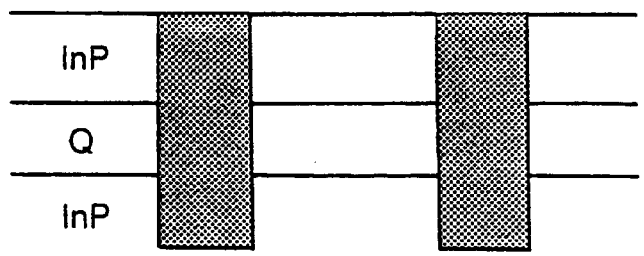
FIG. 6 is a schematic of a second alternative photonic crystal.

It will be understood that the above process is described by way of example only, and that a variety of other processes may be used. For example, methane/hydrogen RIE may also be used. The etching may be followed by regrowth to fill the holes with a second dielectric material having a different refractive index to the substrate. FIG. 6 is a schematic of a photonic crystalline region formed in this manner. In this example, the holes in the waveguide are filled with a III–V semiconductor material such as InP itself, or a ternary e.g. GaInAs. The material used to fill the holes may have a refractive index which is variable in response to an applied control signal. For example, it may comprise a liquid crystal material. The refractive index of the fill material then varies in response to a control voltage applied to a gate overlying the photonic crystal, allowing the grating to be tuned to a desired wavelength. Alternatively, the fill material may be, e.g., a semiconductor chosen to have a strong optical non-linearity. In this case its refractive index is controlled in response to an applied optical control signal.

Figure 7A:
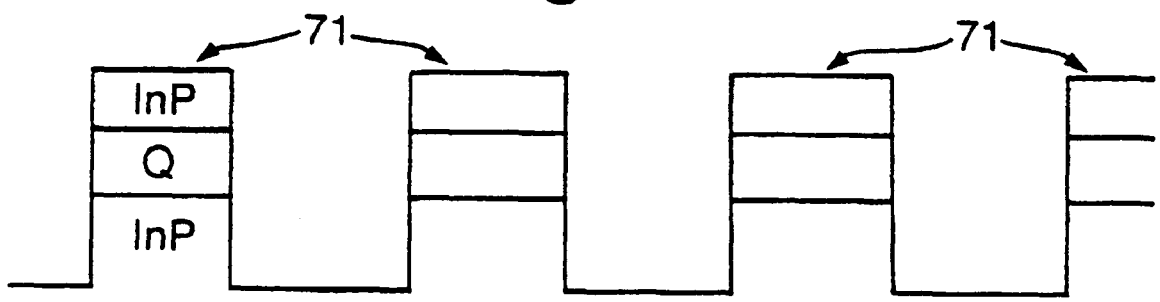
FIGS. 7a and 7b are sectional and plan views of a third alternative photonic crystal.
Figure 7B:
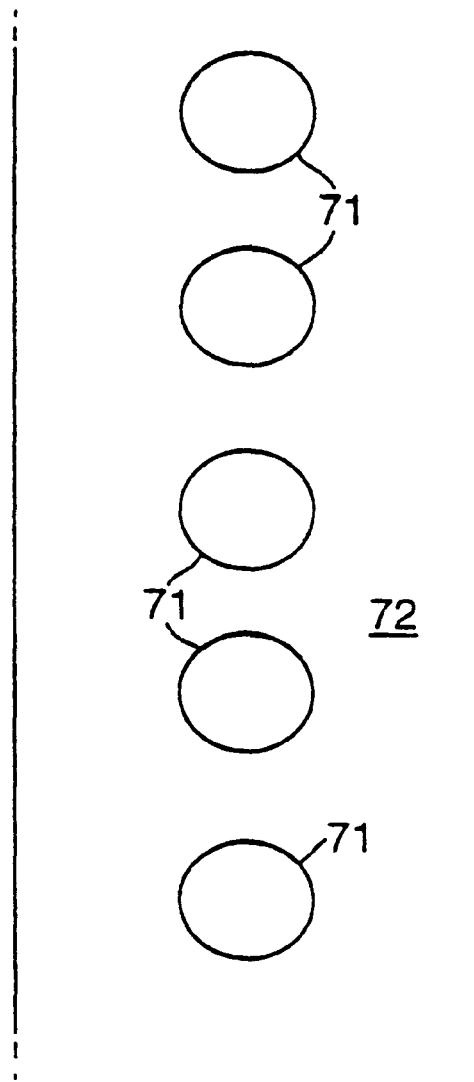

FIGS. 7a and 7b show a further alternative structure for the photonic crystal. In this example, the scattering centres are pillars 71 of the substrate structure, extending into air. This structure may be produced by an RIE process as described above for the first example. The process is modified in that prior to the etching step, the silicon nitride photoresist is exposed everywhere except in the regions which are to form pillars. Then in the etching step, in the region 72 around the pillars the substrate is removed down to a depth of e.g. 0.7 microns leaving the pillars free-standing in a narrow trough in the substrate. It should be noted that although in this example the pillars, and in previous examples the holes, have had a circular cross-section, this is not essential for the functioning of the grating, and that scattering centres having other less uniform shapes may be used. For example the cross-section may be generally ellipsoid, and may vary in size at different depths through the hole or pillar. This allows the use of etching processes which may not produce perfectly regular shapes.

Figure 4A:
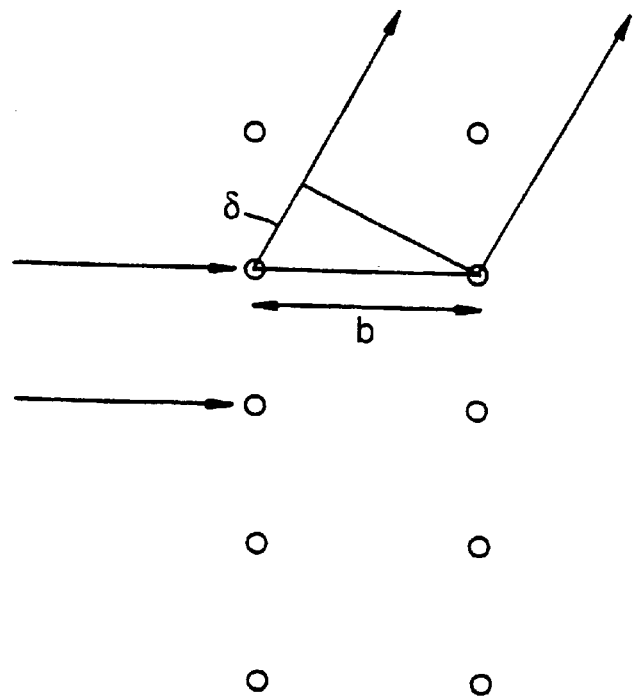
FIGS. 4a and 4b are schematics of alternative photonic crystal microstructures.

The present invention is by no means limited to the use of photonic crystals in the form of one-dimensional arrays as in this first example. FIG. 4a shows schematically an example using 2 rows of holes, with the separation between the rows selected so that the path difference $\delta$ is equal to an integer number of wavelengths, giving constructive interference of the diffracted beam for the design wavelength. This constraint can be expressed algebraically as $\lambda=b(1-\sin(90-\phi))$ where b is the separation between the rows and $\phi$ is the diffraction angle. It can been seen that the use of two more rows has the effect of adding a preferred direction to the diffraction. That is, while the simple 1-dimensional array either transmits or reflects the diffracted order, the modified 2-dimensional structure reinforces either the reflected or the transmitted order, depending on the distance b. A structure formed in this way functions as a fixed wavelength filter.

For the 1-dimensional structure there is also a constraint on the array pitch, wavelength and diffracted angle of the form $\lambda=a\cos\phi$. Where a 2-dimensional structure is used, so that the constraint of the first equation above also applies, then there is a solution only for a single wavelength. The 2-dimensional structure can therefore be engineered to act as a fixed filter for one particular wavelength. The use of multiple rows of scattering centres is particularly preferred when the scattering centres are relatively weak in effect. This is the case if, for example, the holes etched in the substrate are relatively shallow and stop short of the waveguide layer or if they are filled with a second dielectric material having a refractive index close to that of the substrate. In this case more than a minimal array of holes may be required to produce a diffracted beam of sufficient power, and the array may be, for example, 10 or 15 rows deep.

Figure 4B:
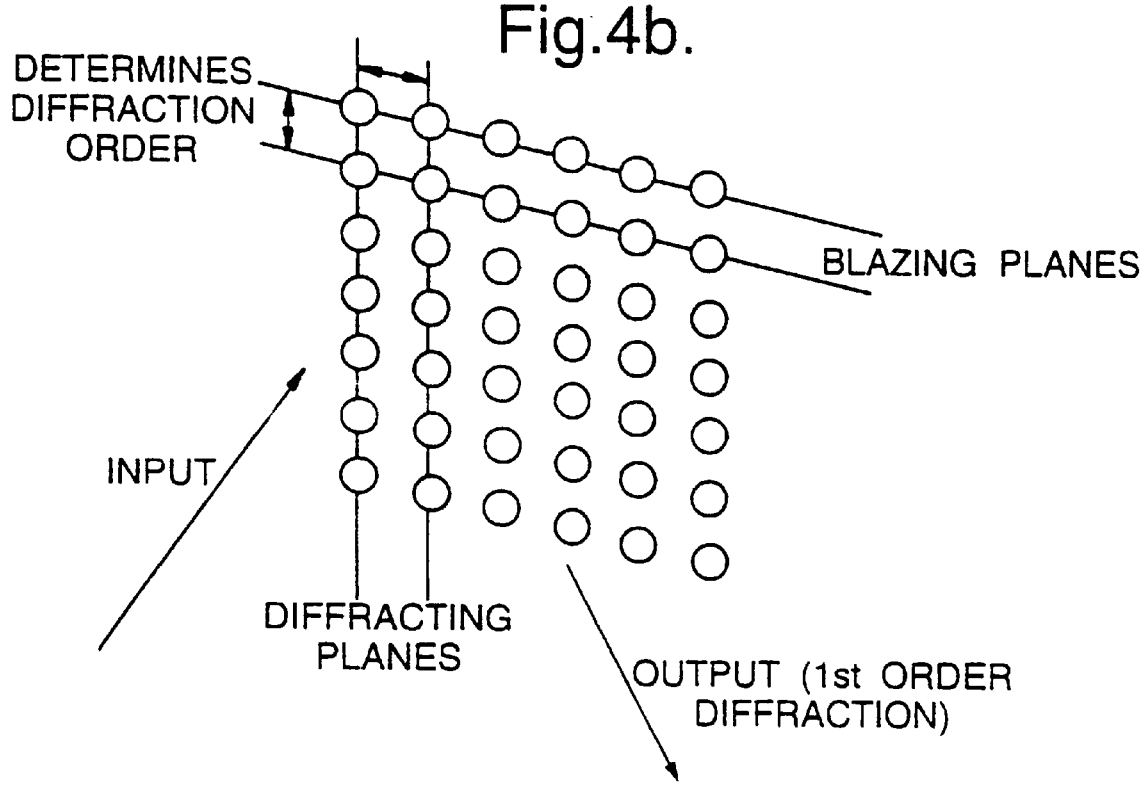

FIG. 4b shows an example of a lattice which is 6 rows deep. This 2-D lattice has two main sets of parallel planes, one running vertically and the other running approximately horizontally. The lattice is designed to obtain non-zero order diffraction from one set of planes, and zeroth order diffraction from the other set. The condition is applied that both sets of planes should give rise to diffraction in the same direction. Therefore to obtain zero order diffraction (specular reflection), the planes running approximately horizontally should be angled such that their normal bisects the angle between the input beam and the output beam. The spacing of these planes is not critical, but it can be advantageous to space them so that the microstructures along the planes have a separation sufficiently small that only zero order diffraction results. The planes running approximately horizontally have in general a separation less than the separation of the microstructures in the 1-D array considered originally. The following condition applies for first order diffraction:

sin θ+sin φ=nλ/d where n is the order, λ is the wavelength, d is the separation of the planes or structures, and θ and φ are the angles of incidence of the incoming and outgoing beams. A structure which is formed in this way is not limited in operation to a single wavelength, but reinforces and diffracts different wavelengths through different angles. It is therefore suitable, for example, for use as a wavelength division mulitplexing (WDM) demultiplexer.

For the purposes of illustration, the above discussion treats the photonic crystal as comprising weak scattering centres, producing Bragg diffraction. In reality, the scattering centres in general produce strong scattering. The present inventor has carried out a novel analysis of a one-dimensional array of strong scattering centres, which is set out below.

The derivation of the dispersion equation for a planar photonic crystal will first be described. Let $k_i$ and $k_d$ be the wavevectors for the incident and diffracted waves and g a reciprocal lattice vector for the periodic variation of the —refractive index which is the essential aspect of the grating. Because the electromagnetic fields that constitute the incident and diffracted waves must belong to the same irreducible representation of the group of translational symmetry operations for the grating, then $$k_d \cdot \hat{g} = (k_i + g)\hat{g} \qquad (1)$$

where $\hat{g}$ is the unit vector along g ie parallel to the grating. Denoting by $\theta_i$ and $\theta_d$ the angles the incident and refracted beams make with the normal to the grating and by $$k = \frac{2\pi}{\lambda}$$

the magnitude of the wavevector of the light (λ is the wavelength of the light in the medium either side of the grating) the equation (1) may be written $$k\sin\theta_d = k\sin\theta_i + \frac{2\pi}{a} \qquad (2)$$

for first order diffraction; α is the-pitch of the grating. In terms of λ equation (2) may be written as $$\lambda = a(\sin\theta_d - \sin\theta_i) \qquad (3)$$

Differentiation wrt λ gives $$\frac{d\theta_d}{d\lambda} = \frac{1}{a\cos\theta_d} \qquad (4)$$

For grazing emergence $\theta_d = \pi/2$ and the derivative is infinite. The grating will therefore, under these conditions, produce very large rates of change of angle of emergence $\theta_d$ with wavelength when these angles are small. This is ideal for WDM demultiplexing.

The calculation of field intensities for the reflected transmitted and diffracted beams will now be described. A grating will only be useful at grazing emergence if the grating diffracts sufficient optical power. A measure of this is the square of the electric field in the diffracted beam compared with that in the incident beam. Such calculations have been performed for a single line of air cylinders in indium phosphide for the electric field polarised along the axes of the cylinders, which is taken as the z axis in a Cartesian coordinate system. The wave equation for the electric field E(x, y) derived from the Maxwell equations for propagation in the (x, y) plane, at angular frequency ω, is $$\frac{\partial^2 E}{\partial x^2} + \frac{\partial^2 E}{\partial y^2} = \varepsilon(r)\left(\frac{\omega}{c}\right)^2 E \qquad (1)$$

where $\epsilon(r)$ is the dielectric constant as a function of r=(x,y). For waves propagating with wave vector k in a region with periodic variation in the dielectric constant, the electric field can be written as $$E = \sum_G \tilde{E}_G \exp(i(k+G)\cdot r) \qquad (2)$$

where G is a reciprocal lattice vector and the equation for the plane wave coefficients, $\tilde{E}_G$, is $$\sum_{G'} \tilde{\varepsilon}^{-1}_{G-G'}(k+G')^2 \tilde{E}_{G'} = (\omega/c)^2 \tilde{E}_G \qquad (3)$$

where $$\varepsilon^{-1}(r) = \sum_G \tilde{\varepsilon}^{-1}_G \exp(iG\cdot r) \qquad (4)$$

is the plane wave expansion of the inverse of $\epsilon(r)$. The auxiliary equation for the plane wave coefficients of the y component of the magnetic field is $$\sqrt{\frac{\mu_0}{\varepsilon_0}} \tilde{H}_{yG}(k) = -\frac{(k_x + G_x)}{(\omega/c)} \tilde{E}_G(k) \qquad (5)$$

The x axis is chosen to be perpendicular to the plane of the grating. To solve the wave equation (1) inside the grating one needs to find the possible components $k_x$ of the wavevector for propagation with fixed y component, $k_y$, and fixed frequency ω. The equations (4) and (5) can be converted into an eigenvalue problem for $k_x$.

$$\begin{bmatrix} -G_x \delta_{G,G'} & -\frac{\omega}{c}\delta_{G,G'} \\ ((k_y+G_y)^2/(\omega/c))\delta_{G,G'} - (\omega/c)\tilde{\varepsilon}_{G-G'} & -G_x \delta_{G,G'} \end{bmatrix} \begin{bmatrix} \tilde{E}_{G'} \\ \sqrt{\frac{\mu_0}{\varepsilon_0}} \tilde{H}_{yG'} \end{bmatrix} = k_x \begin{bmatrix} \tilde{E}_G \\ \sqrt{\frac{\mu_0}{\varepsilon_0}} \tilde{H}_{yG} \end{bmatrix} \qquad (6)$$

From the solutions to this eigenvalue problem one can construct the general solution of the wave equation inside the grating by linear superposition and determine the coefficients by using the continuity of the electric field and its derivatives at the boundary of the grating. The resultant set of linear equations obtained is, in partitioned matrix form, $$\begin{bmatrix} -\delta_{g,g'} & 0 & e^{(+)}_{g,n}(a_{1x}/2)\exp(iK_n^{(+)}a_{1x}) & e^{(-)}_{g,n}(a_{1x}/2) \\ \overline{K_g^{(+)}}\delta_{g,g'} & 0 & h^{(+)}_{g,n}(a_{1x}/2)\exp(iK_n^{(+)}a_{1x}) & h^{(-)}_{g,n}(a_{1x}/2) \\ 0 & -\delta_{g,g'} & e^{(+)}_{g,n}(-a_{1x}/2) & e^{(-)}_{g,n}(-a_{1x}/2)\exp(-iK_n^{(-)}a_{1x}) \\ 0 & \overline{K_g^{(-)}}\delta_{g,g'} & h^{(+)}_{g,n}(-a_{1x}/2) & h^{(-)}_{g,n}(-a_{1x}/2)\exp(-iK_n^{(-)}a_{1x}) \end{bmatrix} \begin{bmatrix} T_{g'} \\ R_{g'} \\ A_n^{(+)} \\ A_n^{(-)} \end{bmatrix} = \begin{bmatrix} 0 \\ 0 \\ I_g \\ \overline{K_g^{(+)}}I_g \end{bmatrix} \quad (7)$$

where $$e_{g,n}(x) = \sum_{ng1} \tilde{E}_G(k)\exp\{2i\pi(ng1 - ng2(a_{1y}/a_2))x/a_{1x}\}$$

and the integers ng1 and ng2 are defined by G=ng1b$_1$+ng2b$_2$. g is the y component of G. $\overline{K_g^{(\pm)}}$ and K$_n^{(\pm)}$, the z component of the wavevectors of the plane wave solutions outside the grating are defined by $$\overline{K_g^{(\pm)}} = \qquad (8)$$
$$\pm\sqrt{\varepsilon_a - (\overline{k_y} + ng2)^2(2\pi c/\omega a_2)^2} = \pm\sqrt{\varepsilon_a - (\overline{k_y} + ng2)^2(\lambda/a_2)^2}$$

where λ=2πc/ω is the vacuum wavelength.

k=(k$_y$, K$_n^{(\pm)}$) with the ± in the exponent denoting the sign of the imaginary part or in the case of the latter being zero it denotes the sign of the real part. k$_y$=$\overline{k_y}$(2π/a$_2$ and ϵ$_a$ is the dielectric constant of the material either side of the grating.

a$_1$=(a$_{1x}$,a$_{1y}$) and a$_2$=(O,a$_2$) are the lattice vectors of the photonic crystal of which the grating is made. b$_1$ and b$_2$ are the reciprocal lattice vectors defined by a$_i$b$_j$=2πδ$_{ij}$.

The equation (7) is written explicitly for the case in which the grating is just one period of the photonic crystal thick and the origin of coordinates is taken at the centre of the grating layer.

The equations derived above will now be applied to illustrate the effectiveness of one example of a WDM grating embodying the present invention. Assuming normal incidence, θ$_d$ denotes angle of diffracted beam makes with normal to grating. If λ is the wavelength of the light in the medium (either side of the grating) and α is the pitch of the grating, then $$\sin(\vartheta_d) = \frac{\lambda}{a}.$$

For near grazing. emergence θ$_d$ is close to 90° and it convenient to write $$\vartheta_d = \frac{\pi}{2} - \phi$$

where ϕ is small. Using $$\sin\theta_d = \cos\phi \approx 1 - \frac{1}{2}\phi^2$$

we can easily derive the angle ϕ of emergence as a function of wavelength λ ie $$\phi = \sqrt{2\frac{a-\lambda}{\lambda}} = \sqrt{2\frac{\lambda_e - \lambda_0}{\lambda_0}}$$

where λ$_0$=nλ is the vacuum wavelength (n is the refractive index of the medium either side of the grating) and λ$_e$=nα is the vacuum wavelength at grazing emergence. Using this result with refractive index n=2, one finds that one has grazing emergence at 1.560 microns and the beams at wavelengths 1.557 and 1.554 microns emerge at angles ϕ of about 3.5° and 5.0° respectively. So channels separated by 1 nanometer (vacuum) wavelength are separated by angles of about 0.5°. At 1200 microns from the grating this would result in a separation of 10 microns between the beams which is sufficiently far apart to separate them using ridge waveguide technology, as described below with respect to FIG. 9. To avoid crosstalk between the demultiplexed channels the incident beam would have to be sufficiently well collimated when incident on the grating. This would require a grating about 1 mm across and composed of say one row of about 2000 holes at a pitch of about 0.5 micron.

Figure 9A:
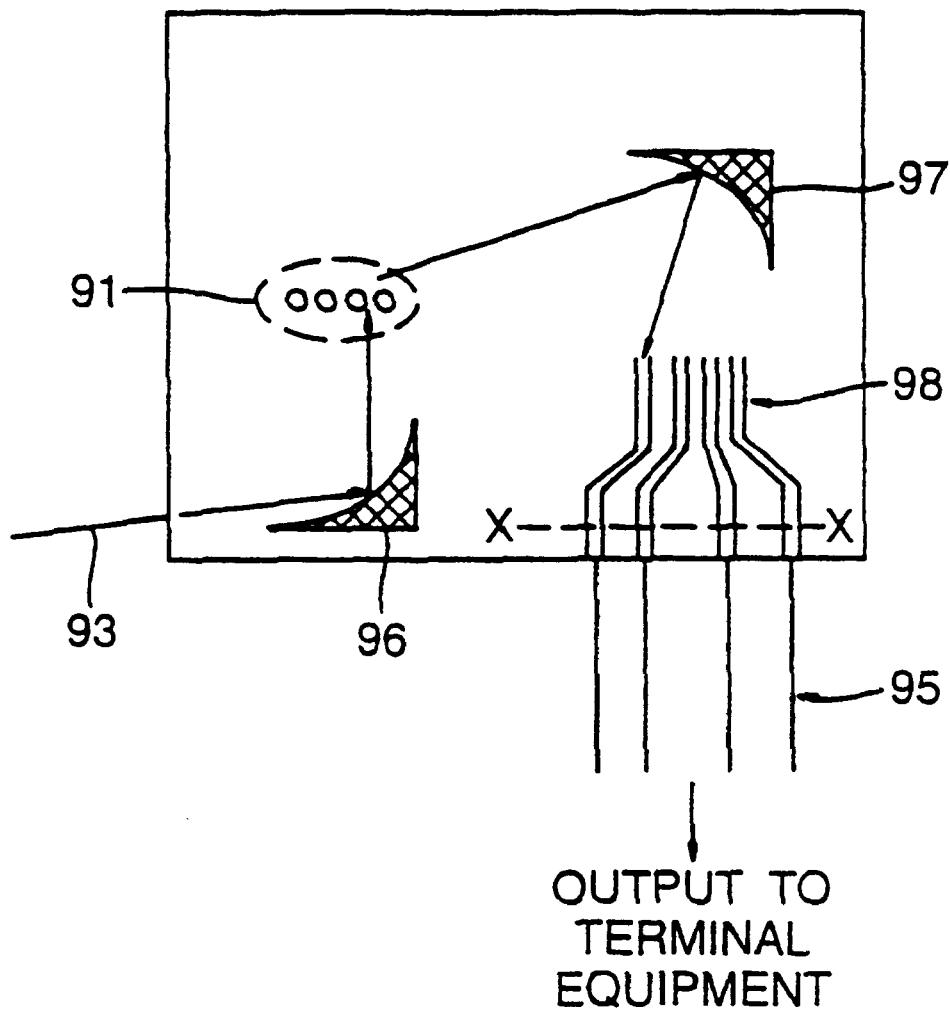
FIGS. 9a and 9b are plan and sectional views of a WDM demultiplexer.

FIG. 9 shows a further alternative layout for a grating embodying the present invention. In this example the grating is shown in use as a WDM demultiplexer, receiving a wavelength multiplex from an optical network and selecting 4 different output channels which are transmitted to local terminal equipment (not shown). Such a configuration might be used, for example, in a local access node in a broadband optical telecommunications network. The grating in this case is generally similar in construction to that of FIG. 1. It includes a lens ended input fibre 93, a region 91 of photonic crystalline material, and an array of four lens-ended output fibres 95. It differs from the grating of FIG. 1 in that concave mirrors 96,97 are used to route the input and output beams. The mirrors allow a more compact layout for the grating. The mirror 96 on the input side serves to collimate the beam incident on the grating, while the mirror 97 on the output side focuses the output beam onto an array of waveguides for the four different output channels. The mirrors may be formed during the course of an RIE process for forming the crystal as discussed above. The cross-hatched regions shown in the Figure are etched away to a depth of 1 to 1.5 microns, well below the depth of the waveguide layer. The impinging beam then undergoes total internal reflection at the curved boundary surface between the planar waveguide and air in the etched-away region. In this example, the input side mirror 96 is spaced from the grating by a distance of 3mm and the output side mirror is spaced from the grating by a similar distance. The beams reflected and focused by the output side mirror impinge upon an array 98 of ridge waveguides. The input end of the array is located at the focus of the mirror 97. Each waveguide is 3 microns wide and the separation between the centres of adjacent waveguides is 6 microns. The ridge in each waveguide is 0.5 microns high. The waveguides fan-out and are coupled at their output ends to the array of output fibre-waveguides 95 which carry the different channels on to different subscriber terminals. FIG.

Figure 9B:
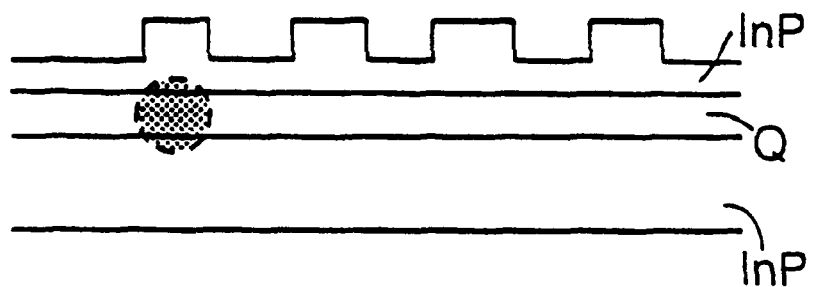

9b is a cross-section through the ridge waveguides on line XX of FIG. 9b. The shaded region illustrates the optical mode confined under one of the ridges.

Figure 10:
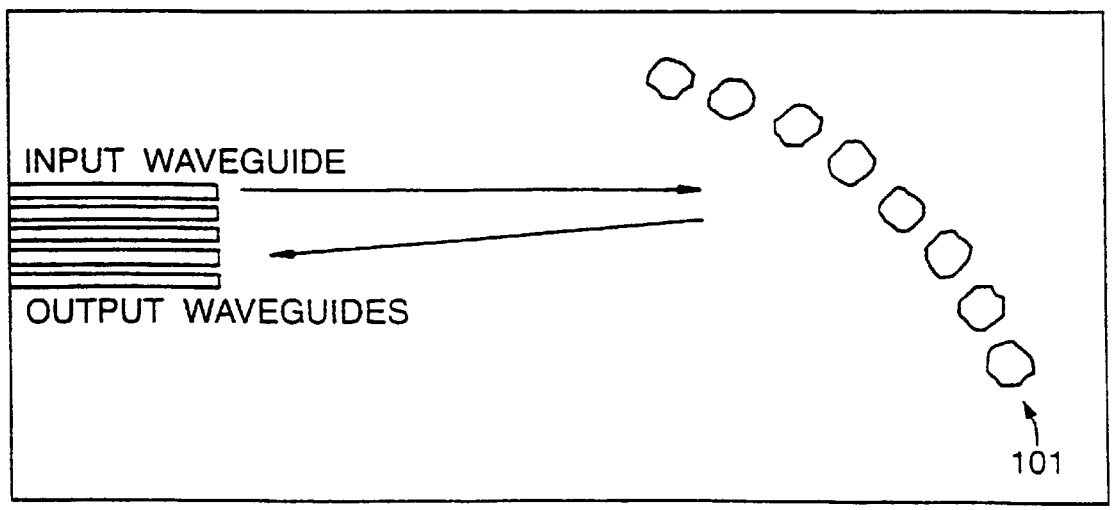
FIG. 10 is a plan view of an alternative embodiment of a WDM multiplexer.

FIG. 10 illustrates another possible stucture for an integrated WDM demultiplexer embodying the present invention. In this example, the microstructure 101 is curved and is used in reflection. This structure has the advantage that the concave layout of the microstructure eleimates the need for a collimating mirror or lens. The fabrication procedure described above allows the grating to be formed in any desired shape, including shapes which cannot be described by simple mathematical functions. The procedure makes possible precise control of the curvature of a microstructure in order to minimise optical aberrations.

Figure 11:
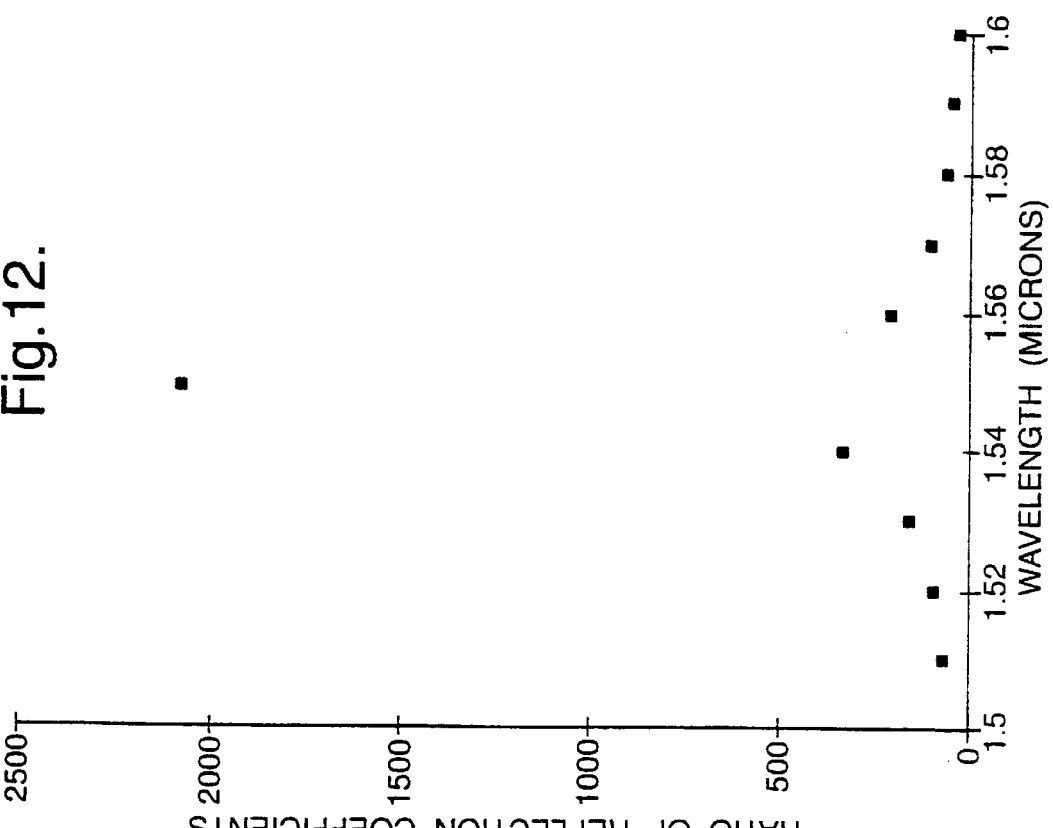
FIG. 11 is a plot showing the polarisation dependence of reflection coefficients of a grating embodying the present invention.
Figure 12:
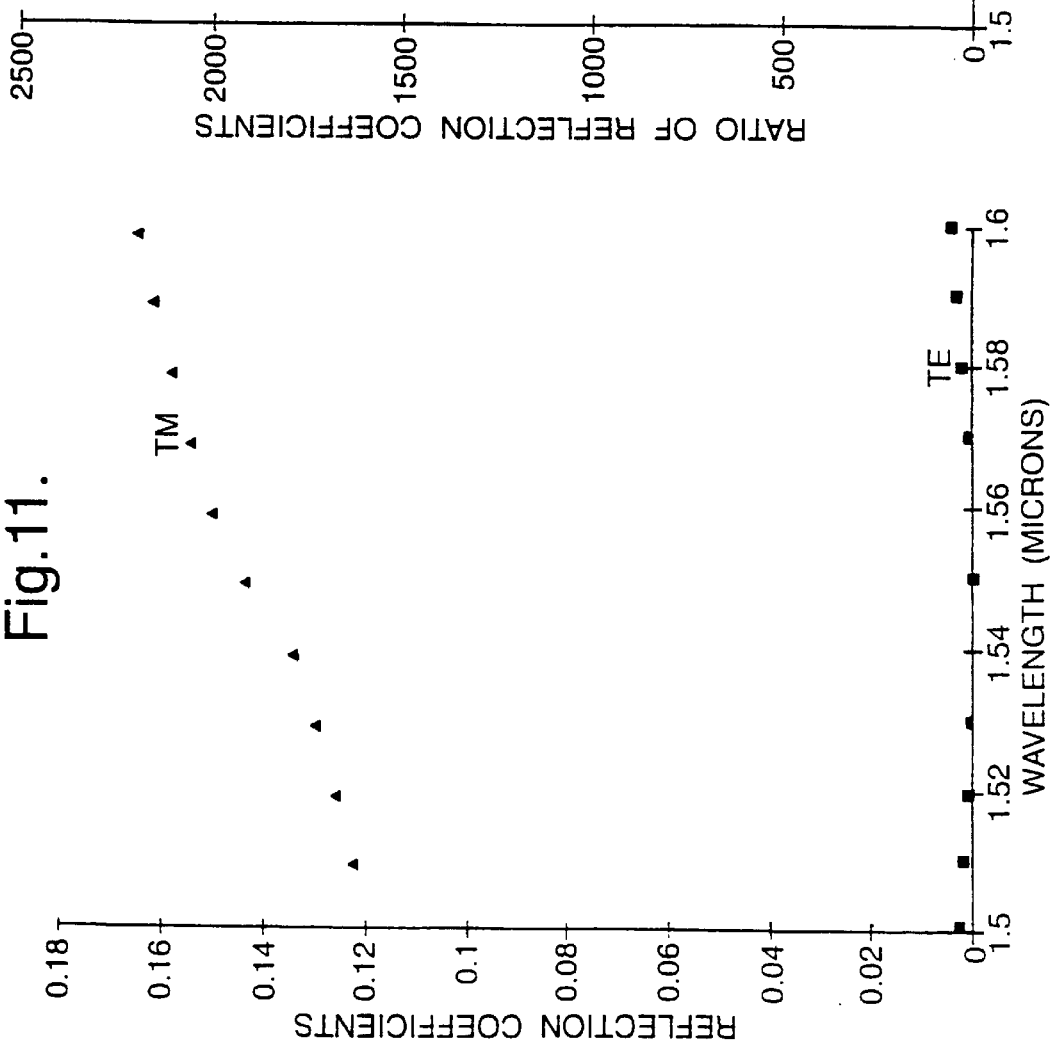
FIG. 12 is a plot showing the ratio of the reflection coefficients of different polarisation states in the example of FIG. 11.

The grating structures described above may be configured to act as polarisation sensitive devices. In this case the input beam is directed towards the grating as before. Now, however the reflected order is picked up, for example by an output waveguide arranged adjacent the input waveguide as in FIG. 10. One polarisation state is found to be reflected far more strongly than the other. FIG. 11 shows the reflection coefficients for the TM (transverse magnetic) and TE (transverse electric) polarisation modes in the case of a structure comprising one layer of circular holes with a pitch of 0.46 microns, incident at an angle theta such that sin (theta)=0.05. As shown in FIG. 12, the ratio of reflection coefficients has a sharp peak as a function of the signal wavelength. This polarisation sensitivity may be exploited, for example, in the construction of a polarisation filter for use in the feedback loop of an active polarisation control system. In such a system the output from the filter passes to a photodetector and is used to drive a feedback circuit which drives electro-mechanical actuators to twist a fibre polariser. In this way a desired polarisation state is maintained at the output of the optical system. The grating may also be used as a polarising beam splitter to separate orthogonal polarisation states, for example in coherent communications systems. In quantum cryptographic key distribution systems, such as those described in the present applicant's international patent application WO 94/15422, polarisation-sensitive detection is required, and the microstructures of the present invention may be used in this context as part of an integrated planar optical receiver. Further, the microstructure of the invention may be used in all-optical switches of the type which employ orthogonally polarised switching and switched beams.

What is claimed is:

1. An optical diffraction grating comprising:
   a) a region of photonic crystalline material;
   b) means for coupling an input beam to the photonic crystalline material;
   c) means for receiving a grazingly emergent output beam from the photonic crystalline material;
   the photonic crystalline material including generally regular array of scattering centers formed in a dielectric material; and
   in which the array of scattering centres is a minimal array no more than 10 rows deep and preferably only 1, 2 or 3 rows deep.

2. A grating as in claim 1 in which the region of photonic crystalline material is generally planar.

3. A grating as in claim 1, in which:
   the array comprises 2 or 3 rows, and
   the spacing between the rows is such that, at a predetermined wavelength of operation, the grazingly emergent beam scattered from one row interferes constructively with the grazingly emergent beam scattered from the or each other row.

4. A grating as in claim 1 in which the means for coupling an input beam and means for receiving an output beam include waveguides formed on a common substrate with the photonic crystalline material.

5. A grating claim 1 in which the dielectric material is a III–V material.

6. A grating according to claim 5, in which the dielectric material is indium phosphide.

7. A grating as in claim 1 in which the scattering centers comprise holes formed in the dielectric substrate.

8. A grating as in claim 7, in which the holes are filled with a dielectric material.

9. A grating as in claim 1 in which the means for coupling an input beam include means for collimating a beam incident on the region of photonic crystalline material.

10. A wavelength multiplexer or demultiplexer including a grating as in claim 1.

11. A polarisation selective filter incorporating an optical diffraction grating as in claim 1.

12. An optical diffraction grating comprising:
   a) a region of photonic crystalline material;
   b) means for coupling an input beam to the photonic crystalline material;
   c) means for receiving a grazingly emergent output beam from the photonic crystalline material;
   the means for coupling an input beam and means for receiving an output beam including waveguides formed on a conunon substrate with the photonic crystalline material; and
   in which at least one of the waveguides comprises a ridge waveguide arranged to confine light also in the direction parallel to the planar surface.

13. A grating according to claim 12 in which the waveguides comprise planar structures arranged to confine light in the direction normal to the planar surface.

14. An optical diffraction grating comprising:
   a) a region of photonic crystalline material;
   b) means for coupling an input beam to the photonic crystalline material;
   c) means for receiving a grazingly emergent output beam from the photonic crystalline material;
   in which the grating is configured to operate transmissively, with the means for coupling an input beam and the mean for coupling an output beam located on either side of the photonic crystalline material.

15. An optical diffraction grating comprising:
   a) a region of photonic crystalline material;
   b) means for coupling an input beam to the photonic crystalline material;
   c) means for receiving a grazingly emergent output beam from the photonic crystalline material;
   in which the means for receiving an output beam includes means for focussing the grazingly emergent output beam.

16. A grating as in claim 15 in which:
   the means for coupling an input beam include means for collimating a beam incident on the region of photonic crystalline material, and at least one of the means for collimating and the means for focussing comprises a convex reflective surface formed integrally in a common substrate with the region of photonic crystalline material.

17. A method of manufacturing an optical grating, said method comprising:

forming a region of photonic crystalline material;

forming means for receiving an input beam and means for coupling a grazingly emergent output beam adjacent the said region; and in which the region is formed with a regular array of scattering centers no more than 10 rows deep.

18. A method as in claim 17, including forming the said means for coupling and the region of photonic crystalline material on a common substrate of dielectric material.

19. A method as in claim 18 in which the step of forming the region of photonic crystalline material includes etching a generally regular array of holes with a dielectric material.

20. A method as in claim 19, including a step of subsequently filling the holes with a dielectric material.

21. An optical diffraction grating comprising:

a) an optical input;

b) a region of photonic crystalline material arranged to receive an incident optical beam from the optical input; and c) an optical input arranged to receive an optical beam from the region of photonic crystalline material;

said photonic crystalline material including a generally regular array of scattering centers no more than 10 rows deep.

22. An optical diffraction grating comprising:

a) an optical input;

b) a region of photonic crystalline material which is arranged to receive an incident optical beam from the optical input and which comprises an array of scattering centers formed in a dielectric material, said array being no more than 10 rows deep;

c) an optical output arranged to receive an optical beam from the region of photonic crystalline material.

* * * * *